US010635148B2

(12) United States Patent
Pelissier et al.

(10) Patent No.: US 10,635,148 B2
(45) Date of Patent: Apr. 28, 2020

(54) INFORMATION HANDLING SYSTEM PERIPHERAL PORT POWER BYPASS

(71) Applicant: Dell Products L.P., Round Rock, TX (US)

(72) Inventors: Gerald R. Pelissier, Mendham, NJ (US); Merle J. Wood, III, Round Rock, TX (US); Lawrence E. Knepper, Leander, TX (US); Karunakar P. Reddy, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 15/092,987

(22) Filed: Apr. 7, 2016

(65) Prior Publication Data

US 2017/0293334 A1    Oct. 12, 2017

(51) Int. Cl.
*G06F 1/32*    (2019.01)
*G06F 1/26*    (2006.01)

(52) U.S. Cl.
CPC ............... *G06F 1/266* (2013.01); *G06F 1/32* (2013.01)

(58) Field of Classification Search
CPC ..... G06F 1/32; G06F 1/26; G06F 1/28; G06F 1/00
USPC ....... 713/300, 310, 321, 322, 323, 324, 345, 713/375
See application file for complete search history.

(56) References Cited

U.S. PATENT DOCUMENTS

| | | | | |
|---|---|---|---|---|
| 6,064,554 A * | 5/2000 | Kim | ................ | G06F 1/266 361/64 |
| 2008/0167088 A1* | 7/2008 | Rabu | ................ | G06F 1/1632 455/573 |
| 2008/0294917 A1* | 11/2008 | Khan | ................ | G06F 1/3209 713/310 |
| 2011/0016333 A1* | 1/2011 | Scott | ................ | G06F 1/266 713/300 |
| 2013/0134787 A1* | 5/2013 | Sakakibara | ........... | H02J 7/0068 307/72 |
| 2013/0278216 A1* | 10/2013 | Son | ................ | H02J 9/062 320/112 |
| 2015/0188325 A1* | 7/2015 | Wagner | ................ | H02J 7/0085 307/31 |
| 2016/0036314 A1* | 2/2016 | Koyanagi | ................ | H02M 1/32 363/65 |
| 2017/0060207 A1* | 3/2017 | Backman | ................ | G06F 1/266 |

* cited by examiner

*Primary Examiner* — Jaweed A Abbaszadeh
*Assistant Examiner* — Keshab R Pandey
(74) *Attorney, Agent, or Firm* — Zagorin Cave LLP; Robert W. Holland

(57) ABSTRACT

An information handling system data port system includes plural data ports that support communication of data and power transfer with external devices, such as peripherals. A power transfer manager selectively establishes direct power transfer between data ports in support of power transfer between external devices, such as one external device acting as a power source and another external device acting as a power sink. The power transfer manager establishes direct power transfer with switches that bypass the information handling system power subsystem to provide improved power transfer efficiency.

16 Claims, 3 Drawing Sheets

INFORMATION HANDLING SYSTEM PERIPHERAL PORT POWER BYPASS

BACKGROUND OF THE INVENTION

Field of the Invention

The present invention relates in general to the field of information handling system power management, and more particularly to an information handling system peripheral port power bypass.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Portable information handling systems typically operate on external power when available and an internal power source, such as a battery, when external power is not available. Conventional external power sources for portable information handling systems typically convert alternating current (AC) into direct current (DC) with an external adapter that feeds DC power to the portable information handling system through a power port. Large AC-to-DC power adapters often provide power in excess of 100 W so that the portable information handling system has sufficient power available to fully operate all integrated components while simultaneously charging the integrated battery. Generally, when operating on an external power adapter portable information handling systems also have sufficient power to output power to external peripherals, such as displays, keyboards, tablets and smartphones that couple to the portable information handling system through a peripheral data cable, such as a USB cable. Some inefficiency is associated with each power transfer as power is converted from AC to DC or converted between DC voltage levels used by each subsystem. End users feel this inefficiency in the form or thermal energy released at the external adapter or the system housing.

Recently, many smaller portable information handling systems have adopted peripheral data ports for use as power ports. For example, many smartphone and tablet portable information handling system have a single USB port that couples though a USB cable to an external power adapter for accepting DC power. Advantageously, an end user is able to couple the portable system to another portable system to both transfer data and receive external power. With conventional USB 2.0 ports, power transfer is typically limited to one direction, i.e., into the portable system, and limited to USB standard transfer currents, such as 500 mA, 900 mA or 1.5 A. Standard USB 2.0 ports perform a standardized power handshake in order to negotiate the power transfer capabilities of the power source and sink, thus ensuring that at an overcurrent condition does not arise. Although convenient, such USB based power transfer rates tend to be insufficient to run all integrated components simultaneously. For instance, tablet and smartphone information handling systems generally need some battery charge to supplement component operations during heavy power draw operations, such as at system boot.

In order to address the increased power use of portable information handling system USB 3.0 includes a Type C connector rated for power transfer of 100 W. Further, the Type C connector supports two-way power transfer so that a portable information handling system can both receive power from and transfer power to an external device coupled through a USB cable. The USB controllers on each of the systems perform a handshake to negotiate power transfer capabilities so that power transfer is available at appropriate levels in both directions. In some situations, a portable information handling system can receive and transfer power at multiple data ports simultaneously, such as where the portable system receives external power from an external power adapter at one USB port while powering a peripheral device from another USB data port. Each external interface negotiates with a USB controller on the portable system so that power transfer in and out is managed as a separate domain. One disadvantage of such power transfer is that inefficiency is introduced at each power transfer conversion through internal charge and supply pathways.

SUMMARY OF THE INVENTION

Therefore, a need has arisen for a system and method which manages information handling system peripheral port power pathways during multidirectional power transfers.

In accordance with the present invention, a system and method are provided which substantially reduce the disadvantages and problems associated with previous methods and systems for managing information handling system peripheral port power pathways. Direct power transfer between first and second data ports is selectively established that bypasses power transfer through information handling system power systems to improve power transfer efficiency.

More specifically, an information handling system processes information with processing components disposed in a housing. Plural data ports disposed at the housing connect with data cables to support data transfer and power transfer between the information handling system and external devices. A power transfer manager executing on the information handling system, such as a firmware module executing on an embedded controller, port controller or charger, detects multidirectional power transfer through plural of the ports between external devices. The power transfer manager selectively configures the data ports to directly transfer power between each other so that an external device power source directly provides power to an external device power sink through the data ports without routing power through the information handling system power subsystem, such as the charger. For example, the power transfer manager selectively opens and closes switches that establish a direct power transfer between data port pairs interfaced with the external devices.

The present invention provides a number of important technical advantages. One example of an important technical advantage is that power transfer through plural data ports is coordinated to improve power efficiencies. An internal power transfer pathway bypass routes power directly from a source power device to a sink power device, thus avoiding inefficiencies associated with power management at the portable information handling system. For example, power into an information handling system USB port routes directly to another USB power port for powering an external device so that power loss with internal power transfer charge and supply pathways is avoided. By coordinating the power transfer directly between the two peripheral devices, the portable information handling system becomes an intermediate charging station that operates in a powered down state to further reduce power consumption.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Information handling system multidirectional power transfer managed through data ports bypasses internal power supply systems for improved power transfer. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
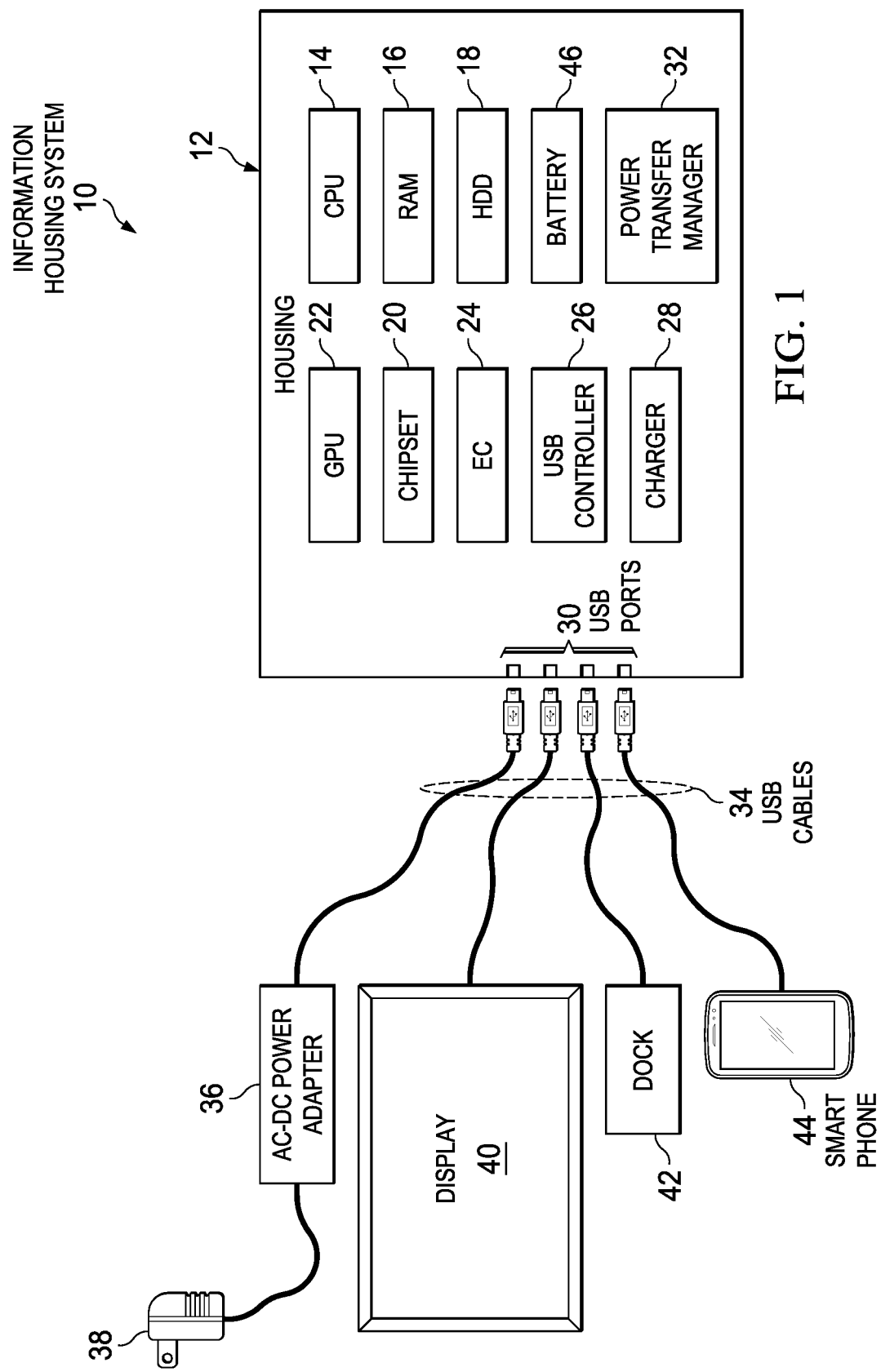
FIG. 1 depicts a block diagram of an information handling system providing selective direct power transfer between data ports.

Referring now to FIG. 1, a block diagram depicts an information handling system 10 providing selective direct power transfer between data ports 30. Information handling system 10 processes information with processing components disposed in a housing 12. Housing 12 may be a portable housing that supports laptop or tablet configurations, or may be a desktop or other type of fixed-location device. A central processing unit (CPU) 14 disposed in housing 12 processes information by executing instructions stored in random access memory (RAM) 16, such as instructions of an application. A persistent storage device, such as a hard disk drive 18, stores applications and information during powered down periods. A chipset 20 includes various processors, controllers and firmware instructions that coordinate interaction of the processing components. For example, chipset 20 includes a basic input/output system (BIOS) that coordinates power up of the processing components from an off state with a boot operation to retrieve and operating system and applications from hard disk drive 18 to RAM 16 for execution on CPU 14. Chipset 20 coordinates input and output of information, such as presentation of information as visual images through a graphics processor unit (GPU) 22. An embedded controller 24 interfaces with chipset 20 to manage power and human interface devices, such as keyboard or mouse.

In the example embodiment, embedded controller 24 provides power management by coordinating application of external power through a charger 28 to run the processing components and charge an integrated battery 46. A USB controller 26 interfaces with plural USB ports 30 that accept power from external power sources. USB controller 26 cooperates with embedded controller 24 and charger 28 to make the external power available for use to power the processing components. In the example embodiment USB ports 30 are USB TYPE C™ ports that provide bidirectional power transfer under the control of a power transfer manager 32. For example, if an external device has power available, power is transferred to charger 28 in accordance with a USB power transfer negotiation or handshake, known as the USB Power Delivery Protocol (USB-PD). Although the example embodiment is described based upon USB-PD, other types of bi-directional power transfer may be used. If an external device needs power, power is transferred from charger 28 to the external device acting as a power sink. Power transfer manager 32 controls power transfer according to power transfer rules, such as based upon the availability of external power, the battery charge state and the priority for power need of the external device. In the example embodiment, the external devices include an AC-to-DC adapter 36 that converts external AC power 38 to DC power for transfer through a USB cable 34. In alternative embodiments, power adapter 36 may provide power through a specialized power port. A display 40 interfaces with USB cable 34 (or a DisplayPort cable that has a Type C connector) to receive visual information for presentation. Display 40 typically receives power from information handling system 10, but may also provide power. A dock 42 interfaces through USB cable 34 to provide power and networking resources as well as an interface for peripheral devices. A smartphone 44 interfaces with USB cable 34 to transfer information and receive power.

Power transfer manager 32 is, for example, a firmware module that operates on one or more of embedded controller 24, USB controller 26 and charger 28. Power transfer manager 32 monitors for conditions related to multidirectional power transfer through data ports 30 and responds to such conditions by coordinating a direct power transfer from a power source data port 30 to a power sink data port 30. For example, when power transfer manager 32 detects input power at a first data port 30 and simultaneous output power at a second data port 30, if adequate power is available for operations of information handling system 10 (i.e., another power source in or a fully charged battery), then power transfer manager 32 manipulates switches between the ports 30 so that power transfers between the ports without passing though charger 28. Bypassing charger 28 improves efficiency for the power transfer between external devices through data ports 30 since charger 28 does not perform any power conversions in the system charging path to make power received at one data port 30 available to another data port 30.

In operation, USB controller 26 performs a standard USB power negotiation handshake with external devices as the external devices couple to data ports 30 with USB cables 34. In the negotiation, a maximum power transfer capability is established for the external devices and charger 28. Power transfer may initiate in a conventional manner supported by USB controller 26 and charger 28, or a bypass configuration may be initiated before power transfer begins. Once power transfer manager determines that a source and sink external device have compatible power transfer characteristics, power transfer manager 32 coordinates a power transfer handshake with USB controller 26 that ensures power transfer will remain within the constraints of both the source and sink power devices. After the maximum power transfer constraints are configured (i.e., that falls within the capabilities of the source device to provide power, the sink device to receive power and the information handling system to both receive a provide power), power transfer manager 32 manipulates switches to route power directly from a power source data port 30 to a power sink data port 30 so that charger 28 is bypassed. In one alternative embodiment, power transfer manager 32 instead provides a direct data transfer between source and sink power devices so that the source and sink power devices perform a handshake directly with each other. For example, data communication to perform the handshake may be provided with switching performed digitally within USB controller 26 or with an analog switch that provides direct electrical signal interface between source and sink data ports.

Figure 2:
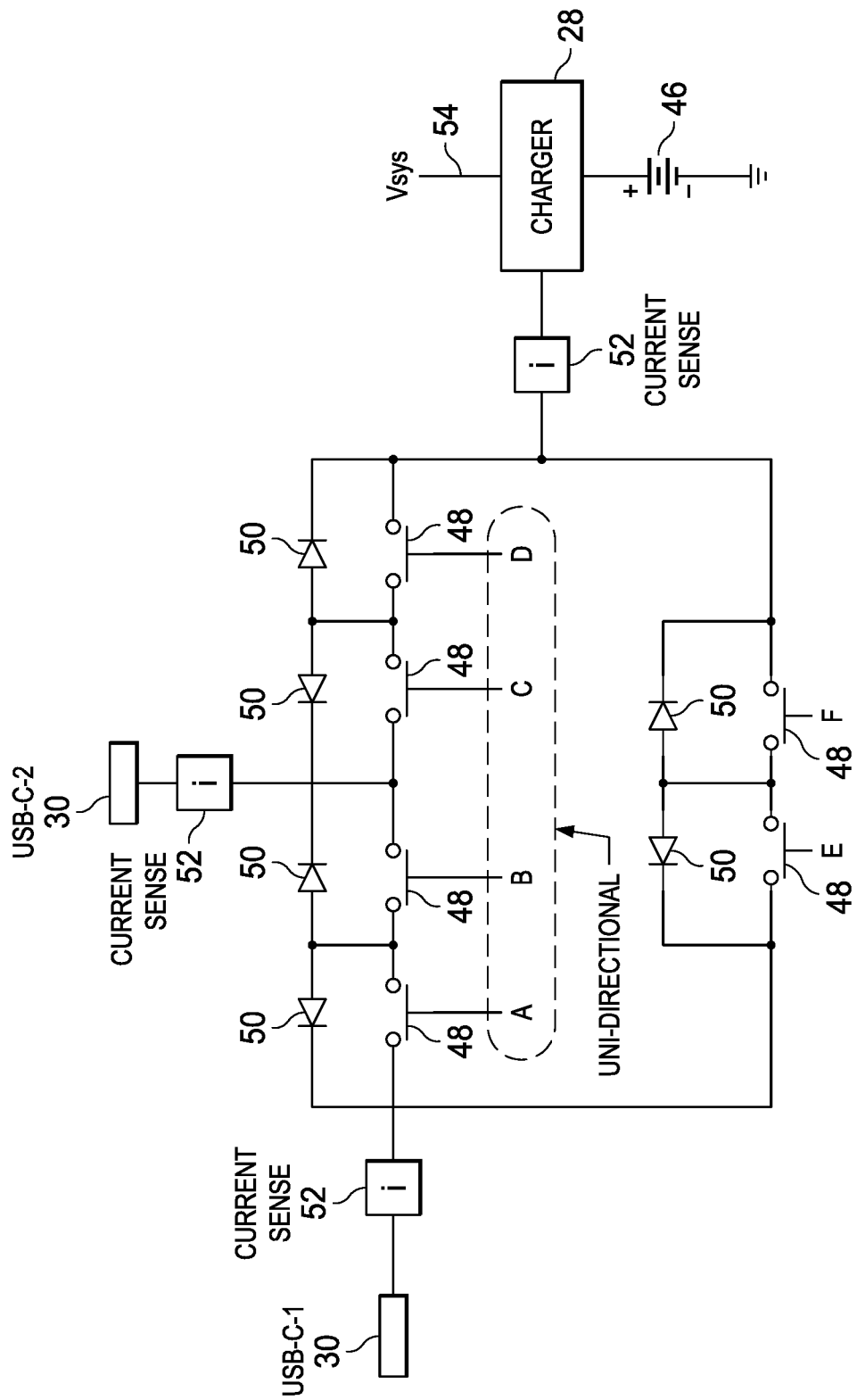
FIG. 2 depicts a circuit block diagram of a data port system having selective configuration of power transfer between data ports.

Referring now to FIG. 2, a circuit block diagram depicts a data port system having selective configuration of power transfer between data ports 30. In the example embodiment, USB TYPE C™ data ports are contemplated, however, in alternative embodiments alternative types of ports may be used. Charger 28 interfaces with data ports 30 labeled USB-C-1 and USB-C-2 to both accept power from external devices and to provide power to external devices. During conventional operations, external power provided to charger 28 is used to provide power to a Vsys bus and to charge battery 46; if sufficient power is available, charger 28 under the management of a data port controller provides power out to external devices through a port 30. Thus, during conventional operations, power in from an external device through a port 30 is converted by charger 28 for use to provide power out to external devices through another port 30.

In order to establish a direct power transfer between two data ports 30 that bypasses charger 28, a power manager manages open and closed positions for switches 48 with power transfer direction restricted by diodes 50. During power transfer, current provided through the direct connection is monitored by current sense devices 52 so that the power manager can open switches to cutoff power transfer if an overcurrent situation arises that exceeds constraints of the information handling system or of an external device coupled to a port 30. As an example, to directly provide power from USB C-1 to USB C-2, switch A closes to allow current to pass through and switch B opens to route current towards USB C-2 instead of towards charger 28. A similar arrangement of physical switches may be used on data lines of each port 30 to route data connections if a direct power transfer handshake is desired between the ports 30.

Figure 3:
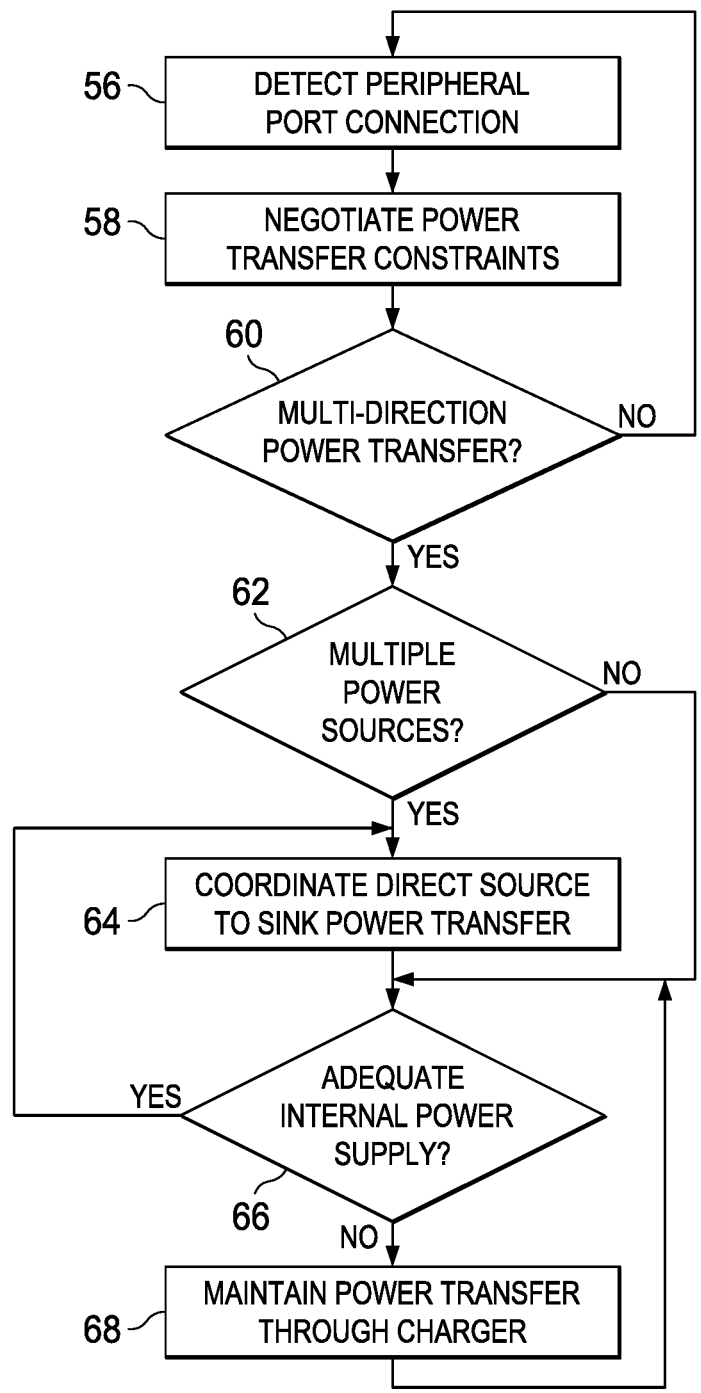
FIG. 3 depicts a flow diagram of a process for establishing direct power transfer between information handling system data ports.

Referring now to FIG. 3, a flow diagram depicts a process for establishing direct power transfer between information handling system data ports. The process begins at step 56 with detection of a peripheral port connection, such as a USB TYPE C™ cable connection that interfaces the information handling system and an external device. At step 58 power transfer constraints are negotiated to establish power transfer parameters for power transfer between the external device and the information handling system. At step 60 a determination is made of whether a multidirectional power transfer is configured at the information handling system. If not, the process returns to step 56 to monitor for additional external device connections. If a multidirectional power transfer is configured, the process continues to step 62 to determine whether a direct power transfer between a power source and power sink port is desired.

At step 62, a determination is made of whether multiple power in sources are available at the data ports or from other external power sources. If multiple power sources are available, then one external power source can remain configured for the information handling system while the other is configured to provide direct power transfer to an external power sink. If only one external power source is available, then the power consumption needs of the information handling system are weighed against efficiencies available by a direct transfer to determine whether to configure a direct transfer of power between data ports. If at step 62 multiple power sources are available, the process continues to step 64 to coordinate direct source to sink power transfer. If at step 62 multiple power sources are not available, the process continues to step 66 to determine if adequate internal power supply is available for information handling system needs. For example, if the information handling system is idle with the display off, operation on battery for a time period will have minimal impact on battery charge and the process continues to step 64 to coordinated direct port-to-port power transfer. As another example, if the information handling system is actively engaging with an end user and presenting visual information at a display, internal power use needs may take priority over power transfer efficiencies so that a direct power transfer is not configured. If power into a data port has priority for use at the information handling system, the process continues to step 68 to maintain power transfer configuration through the information handling system charger. From steps 64 and 68, periodic or event driven power configuration checks are made at step 66 to determine if a direct power transfer should be configured.

Although the present invention has been described in detail, it should be understood that various changes, substitutions and alterations can be made hereto without departing from the spirit and scope of the invention as defined by the appended claims.

What is claimed is:

1. A portable information handling system comprising:
   a housing;
   a processor disposed in the housing and operable to execute instructions to process information;
   a memory disposed in the housing and interfaced with the processor, the memory operable to store the information;
   a battery disposed in the housing and operable to power the processor and memory;

a charger disposed in the housing, the charger operable to accept power from an external power source and to provide power to an external power sink, the charger further operable to charge the battery;

plural ports interfaced with the charger, each port operable to couple to an external cable, each port further operable to receive power from and provide power to the external cable;

plural switches disposed between the plural ports, the plural switches operable to selectively interface the plural ports with each other and the charger; and a controller interfaced with the charger and the plural switches, the controller operable to operate the switches to disconnect first and second of the plural ports from the charger and to connect the first and second of the plural ports to each other so that the first and second of the plural ports bypass the charger to directly route power received at the first one of the plural ports to the second one of the plural ports;

wherein the controller is further operable to operate the switches to bypass the charger and establish direct communications of data for managing power transfer between the first and second of the plural ports, a first external device interfaced with the first port directly communicating with a second external device interfaced with the second port to negotiate power transfer between the first and second external devices; and wherein the controller is further operable to operate the plural switches to selectively connect and disconnect the first and second ports with the charger when the only external power source available to provide power to the charger couples to one of the plural ports and transfers power to another of the plural ports, the controller selectively connecting and disconnecting the charger based at least in part on the amount of power drawn from the battery when external power is not coupled to the charger.

2. The portable information handling system of claim 1 wherein the plural ports comprise peripheral data ports.

3. The portable information handling system of claim 2 wherein the peripheral data ports are Type C USB ports.

4. The portable information handling system of claim 1 wherein the controller is further operable to negotiate power transfer constraints with a power source device coupled to the first port and with a power sink device coupled to the second port before operating the switches to establish direct communications of data between the first and second ports.

5. The portable information handling system of claim 4 further comprising current sensors disposed between the first and second ports and interfaced with the controller, the controller monitoring the current sensors to maintain power transfer within the power transfer constraints.

6. The portable information handling system of claim 5 wherein the controller comprises a USB controller.

7. The portable information handling system of claim 5 wherein the controller comprises an embedded controller.

8. A method for distributing power between an information handling system and external devices, the method comprising:

detecting a first external device coupled to a first data port of the information handling system, the first external device having a power source configured to transfer power through the data port to a charger of the information handling system;

detecting a second external device coupled to a second data port of the information handling system, the second external device having a power sink configured to transfer power from a charger of the information handling system through the data port to the second external device;

bypassing the charger of the information handling system to establish a direct power transfer from the first data port to the second data port to transfer power from the first external device to the second external device;

establishing a direct data communication between the first data port and the second data port;

performing a power transfer configuration handshake between the first and second external devices though the direct data communication;

monitoring a predetermined power state at the information handling system including at least a power draw from a battery of the information handling system operating without external power by drawing power from a battery;

in response to the monitoring, terminating the bypassing to interface the first and second data ports with the charger; and in response to the terminating, reconfiguring the direct power transfer to an indirect power transfer mediated by a power transfer manager of the information handling system.

9. The method of claim 8 further comprising:

performing a first power transfer configuration handshake between the first external device and a power transfer manager of the information handling system;

performing a second power transfer configuration handshake between the second external device and the power transfer manager of the information handling system; and configuring the direct power transfer to maintain power transfer constraints established by the first and second power transfer configuration handshakes.

10. The method of claim 8 further comprising sensing current at the information handling system between the first and second data ports to manage power transfer within predetermined constraints.

11. The method of claim 8 wherein the first and second data ports comprise USB Type C data ports.

12. A portable information handling system data port system comprising:

plural data ports, each data port operable to communicate data and to transfer power;

a controller interfaced with the plural data ports and operable to configure the data ports to communicate data and transfer power with external devices coupled to the data ports;

plural switches interfaced with the plural data ports, the switches selectively opening and closing to configure the data ports to interface directly with each other or with a charger, the charger selectively charging a battery when external power is available and discharging the battery to power the information handling system when external power is not available; and a power transfer manager interfaced with the plural switches, the power transfer manager operable to open and close the switches to selectively establish direct power transfer between the data ports, the direct power transfer bypassing the charger, the power transfer manager configuring the switches to interface the ports through the charger if the charger lacks an external power source other than the plural data ports, the power transfer manager selectively configuring the switches to interface the ports and bypass the charger when the charger lacks an external power source if power consumption of the information handling system is a predetermined amount;

wherein the power transfer manager is further operable to:

establish direct communication between first and second external devices coupled to the first and second of the plural data ports; and support power transfer between the first and second external devices based upon power transfer settings negotiated directly between the first and second external devices through the direct communication.

13. The portable information handling system data port system of claim 12 wherein the plural data ports comprises USB Type C data ports.

14. The portable information handling system data port system of claim 12 wherein the power transfer manager is further operable to:

negotiate power transfer settings with external devices; and apply the power transfer settings to establish power transfer directly between the external devices through the data ports.

15. The portable information handling system data port system of claim 12 further comprising current sensors interfaced with each of the plural data ports, the power transfer manager monitoring current associated with the data ports to remain within a predetermined limit.

16. The portable information handling system data port system of claim 15 wherein the power transfer manager is further operable to operate the switches to terminate power transfer if sensed current exceeds the predetermined limit.

* * * * *